E. A. COOPER.
Vehicle-Seat.

No. 168,831. Patented Oct. 19, 1875.

Witnesses
Edward Wilhelm
Jno. J. Bonner

Ed. A. Cooper
Inventor
by Jay Hyatt
Atty

UNITED STATES PATENT OFFICE.

EDWARD A. COOPER, OF LANCASTER, ASSIGNOR OF ONE-HALF HIS RIGHT TO JOSIAH LETCHWORTH, OF BUFFALO, NEW YORK.

IMPROVEMENT IN VEHICLE-SEATS.

Specification forming part of Letters Patent No. 168,831, dated October 19, 1875; application filed August 6, 1875.

*To all whom it may concern:*

Be it known that I, EDWARD A. COOPER, of Lancaster, in the county of Erie and State of New York, have invented a certain new and useful Improvement in Fastenings for Seats of Buggies and other vehicles, which improvement is fully set forth in the following specification, reference being had to the accompanying drawing.

My invention relates to a device for securing the seats of buggies and other vehicles to the box or body thereof in a firm and reliable manner, while at the same time permitting the ready removal thereof when required.

Figure 1:
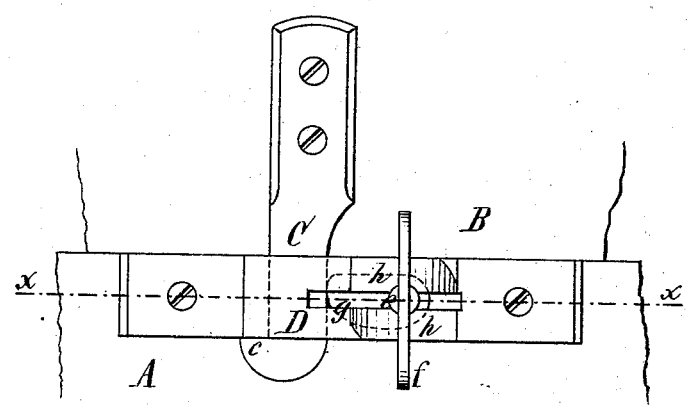
Figure 2:
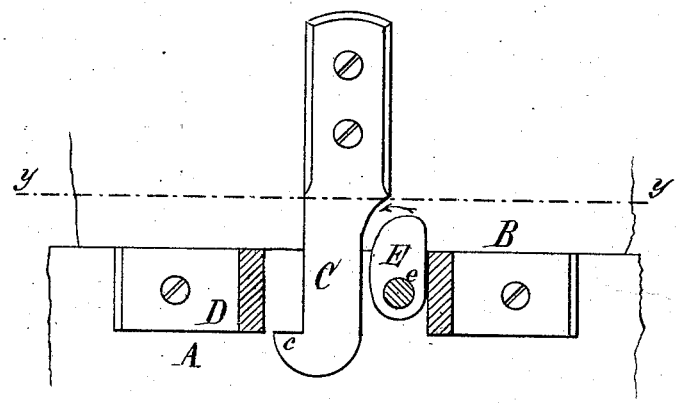
Figure 3:
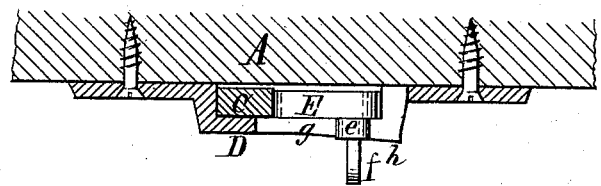
Figure 4:
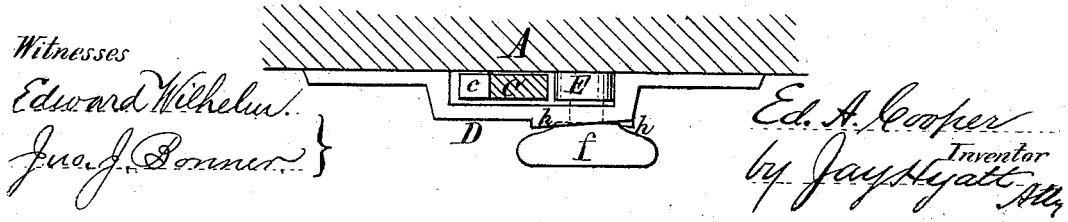

In the accompanying drawing, Figure 1 is a side elevation of the fastening device in a locked position. Fig. 2 is a partly-sectional elevation, showing the fastening released. Fig. 3 is a horizontal section in line $x\ x$, Fig. 1. Fig. 4 is a horizontal section in line $y\ y$, Fig. 2.

Like letters of reference designate like parts in each of the figures.

A represents a portion of the box or body of a buggy, wagon, or other vehicle; and B, a portion of the seat thereof. C is a vertical hook or catch secured to the side of the seat B, and D a U-shaped strap or bearing-piece attached to the side of the body A near the upper edge thereof. In placing the seat on the body A the hook C enters the recess or space between the strap D and body A, and upon moving the seat slightly forward the hook C engages with its projecting nose $c$ under the strap D, thereby retaining the seat against vertical displacement. E is an eccentric or cam, arranged in the recess of the strap D back of the hook C, for securing the latter in position after it has engaged under the strap D. It is provided with a cylindrical neck or shank, $e$, turning in a hole or bearing in the strap D, and carries on the outer side thereof a thumb-piece, $f$, by which it is turned. The cam E, neck $e$, and thumb-piece $f$ are preferably formed in one piece, and the strap D provided with a horizontal slot, $g$, through which the thumb-piece is passed. $h\ h$ are two inclines formed on the outer side of the strap C, on opposite sides of the bearing of the neck $e$ of the cam, and arranged so as to rise in the direction in which the thumb-piece is turned, for wedging the cam against the hook C, so that the highest part of one incline is opposite the lowest part of the other. The shank or neck $e$ of the cam E is made of such length as to permit a slight movement of the cam E and connecting parts in the direction of the axis of the shank when the cam is in an open position, as represented in Fig. 2.

Upon turning the cam and thumb-piece in the direction of the arrow in Fig. 2, for the purpose of locking the hook C in position, the inner surface of the thumb-piece $f$ rides upon the inclines $h\ h$, thereby drawing the cam gradually outward against the strap D, until the latter has arrived in its locking position, as shown in Fig. 1, when it is pressed tightly against the strap, thus locking the cam securely in this position. Upon turning the cam in the opposite direction the thumb-piece $f$ descends on the inclines and releases the cam, while the latter is withdrawn from the hook C, when the latter can be disengaged from the strap D, as shown in Fig. 2, and the seat be removed from the box.

My improved fastening device securely retains the seat in place, and will not work loose by the shocks and jars of the vehicle, but is readily disengaged when required.

What I claim as my invention is—

The combination, with the catch C, attached to the seat A, of the strap or bearing D, secured to the body of the vehicle, and provided with locking-cam E $e$, thumb-piece $f$, and inclines $h\ h$, substantially as and for the purpose hereinbefore set forth.

EDWARD A. COOPER.

Witnesses:
JNO. J. BONNER,
C. J. BUCHHEIT.